Figure 1:
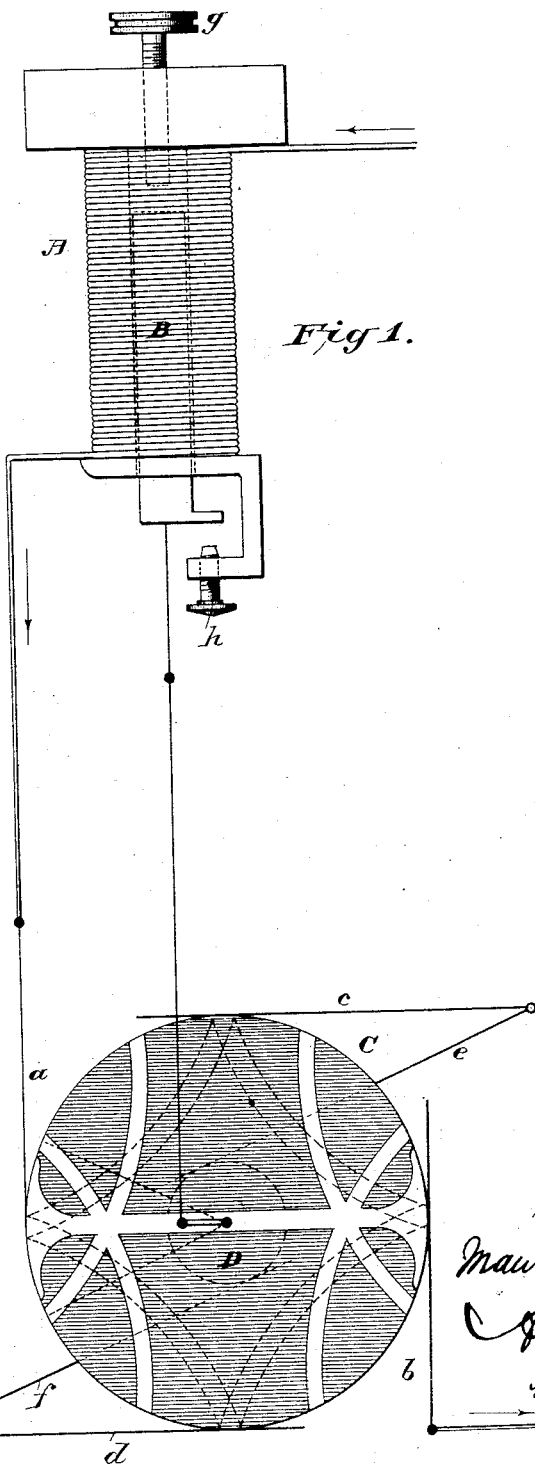

(No Model.)

2 Sheets—Sheet 1.

M. LEVY.
ELECTRIC REGULATOR FOR CONTROLLING THE CURRENT IN ELECTRICAL SYSTEMS.

No. 286,834. Patented Oct. 16, 1883.

Attest:
Geo. T. Smallwood.
C. J. Hedrick

Inventor.
Maurice Lévy by
A. Pollok
his attorney.

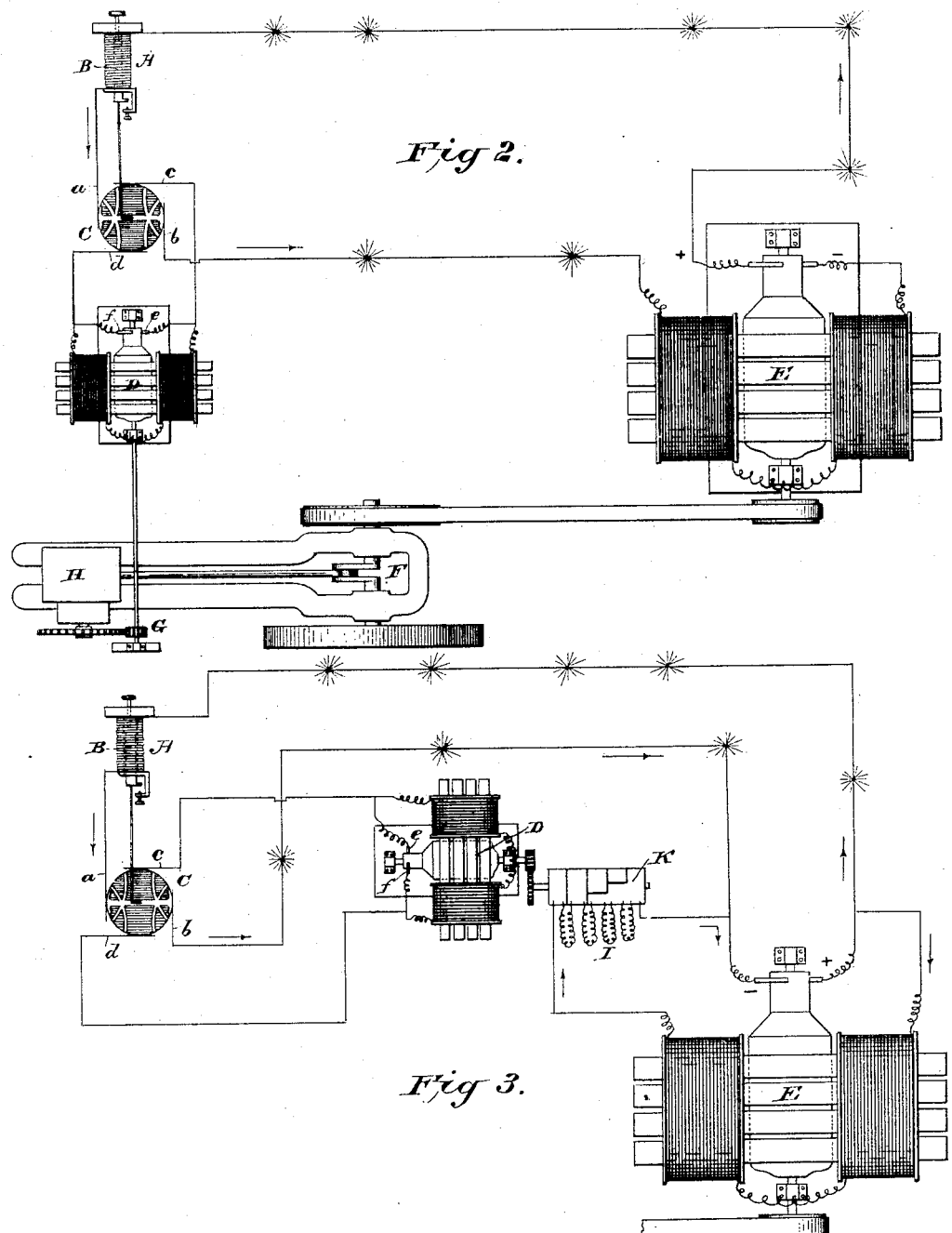

UNITED STATES PATENT OFFICE.

MAURICE LEVY, OF PARIS, FRANCE.

ELECTRIC REGULATOR FOR CONTROLLING THE CURRENT IN ELECTRICAL SYSTEMS.

SPECIFICATION forming part of Letters Patent No. 286,834, dated October 16, 1883.

Application filed June 21, 1883. (No model.) Patented in France January 21, 1882, No. 146,988; in Belgium March 6, 1882, No. 57,253; in Austria July 11, 1882, and in England August 2, 1882, No. 3,689.

*To all whom it may concern:*

Be it known that I, MAURICE LEVY, of Paris, in the Republic of France, have invented a new and useful Improvement in Electric Regulators and Switches for Controlling the Current in Electrical Systems, which improvement is fully set forth in the following specification.

This invention has reference more particularly to means for maintaining uniform the current in an electric circuit, or in a branch or branches thereof, and is applicable to the regulation of the current in systems for supplying electricity for light and power; to the feeding of the electrodes in arc-lamps; to the regulation of the speed of steam-engines and other prime motors, and to other purposes.

The invention consists, first, in the means for operating the current-controlling mechanism—to wit, in an electro-dynamic apparatus, preferably an electric motor with revolving armature and commutator—and an automatic electric switch or relay so arranged and connected electrically and mechanically that the said switch or relay, when excited by a current of normal strength, cuts out said electric motor; but when the current rises above or falls below the normal it diverts the current, or a portion thereof, through the motor in the one direction or the other, and thus causes the motor armature and shaft to turn to the right or left, and moves the device controlled by said shaft in the direction to counteract the divergence and bring back the current to its normal strength. The electric switch or relay may be of any ordinary or suitable construction.

The invention secondly consists, broadly, in an automatic electric switch or relay such as above indicated—that is to say, a switch or relay for cutting a loop out of a line, for connecting it in the line, and for reversing the connections so that the current will not flow at all through said loop or will flow through it in whichever direction may be required, according to the position of the switch or relay.

The invention thirdly consists in the use of an axial magnet or solenoid as the switch-operating means, as well in the combination specified under the first head as in the switch or relay taken by itself, as under the second head.

The invention fourthly consists in the combination of a particular construction of cylindrical switch with an electro-magnet, and specially with an axial electro-magnet or solenoid for operating it, and also in its use in the combinations recited under the first head.

The invention fifthly consists in an electric motor and an electric switch or relay for diverting the current, or a portion thereof, through the motor in either direction, according to the movement of said switch or relay, or for cutting it out altogether, in combination with one or more generators of electricity and means for controlling the electro-motive force of said generators. The control of the electro-motive force may be effected in various ways—as, for example, by regulating the speed of an electrical machine through the admission of steam, water, or other motor-fluid to the engine driving the said machine, which serves as the generator; by regulating the speed of the electrical machine independently of the prime motor; by regulating the excitation of a dynamo-electric machine; by shifting the commutator-brushes on a dynamo-electric machine, or by increasing or decreasing the number of galvanic cells or other generators in circuit. There are known devices for controlling the electro-motive force in these and other ways, and the invention is applicable to them generally.

The invention further comprises certain particular constructions and combinations of parts, as hereinafter set forth.

In the accompanying drawings, Figure 1 is an elevation, partly diagrammatic, showing an electric regulator constructed in accordance with the invention; and Figs. 2 and 3 are diagrams illustrating applications of the same for controlling the electro-motive force of generators.

A is a solenoid or hollow electro-magnet; B, its sliding core or axial armature; C, a switch; *a b c d*, contact springs or brushes; D, an electric motor, and *e f* the commutator brushes or springs of said motor. The switch C is supported on a shaft, and is connected with the core or armature B by means of a crank and connecting-rod, or it may be by other known or suitable mechanical connection. The play of the core and armature, and consequently the vibration of the switch, is regulated by the adjustable stops $g$ $h$. The switch preferably is of cylindrical form, and is made of a metal frame having spaces filled with insulating material. In the drawings the shaded parts are the insulating material, the light parts metal. The metal extends to the periphery of the cylinder, so as to make contact with the brushes or springs $a$ $b$ $c$ $d$ when below them. The brushes or springs $a$ $b$ are connected with the line, the brushes or springs $c$ $d$ with the respective commutator-brushes $e$ $f$ of the motor.

The apparatus is shown in its normal position, the core or armature B suspended by the electric attraction between the stops $g$ $h$, the brushes or springs $a$ $b$ resting upon the metal of the frame, the brushes or springs $c$ $d$ upon the insulating material. The entire current thus passes through the switch. The motor D is cut out. When the current increases, the attraction of the magnet overcomes the weight of the core or armature B and draws it up, turning the switch C to the right, and bringing the metal frame of the switch into contact with the brushes or springs $c$ $d$. A portion of the current is diverted, by way of the springs $c$ $d$ and commutator-brushes $e$ $f$, through the motor D, causing it to revolve. The direct connection through the switch is not broken, but remains intact. The proportion of current diverted therefore depends upon the relative resistances of the direct connection and of the shunt through the motor; but as only a small part of the current would ordinarily be required to operate the motor, the resistance of the direct connection may be very small. When the current diminishes, the weight of the core or armature B overcomes the attraction of the magnet or solenoid and it descends, turning the switch to the left and again diverting a portion of the current through the motor, but in the opposite direction, so that the motor is revolved in the opposite direction to that in which it revolved before. Thus the motor automatically revolves in the one direction or the other, as the current (exciting the electric switch or relay formed by the solenoid or magnet A and switch C) increases or diminishes. Ordinarily the motor would be connected with means for directly or indirectly controlling the current through the relay or switch, so that by varying the resistance or electro-motive force on the line the variations of the current from the normal would be automatically corrected.

In Figs. 2 and 3 two applications of the regulator are shown. In these figures, E is the dynamo-electric machine, and F the prime motor (not shown in Fig. 3) for operating the same. For clearness, the automatic switch or relay A B C is shown in elevation, the other devices in plan, and the motor is shown separated from the switch. Preferably the motor is placed alongside the switch C, as indicated in Fig. 1, but it may be placed apart from it, as shown in Figs. 2 and 3. In Fig. 2 the armature-shaft of motor D is mechanically connected by gearing G with a valve for controlling the admission of steam or other fluid into the cylinder H of the prime motor F. Whenever the core or armature B is raised, the motor-armature revolves and shuts off steam from the prime motor, and thus diminishes the speed of rotation of the dynamo-electrical machine E, and consequently its electro-motive force, until, the current diminishing, the core and switch resume their normal position. When, on the other hand, the core or armature falls, the motor increases the supply of steam, the speed of the dynamo-electric machine is accelerated, and the electro-motive force, and consequently the line-current, increases until the magnet or solenoid A has sufficient power to lift the core or armature B to its normal position and cut out the motor.

In Fig. 3 the dynamo-electrical machine is excited in a derived branch which includes a variable resistance, I K, I being a series of resistance-coils, and K a switch of any suitable construction for successively cutting out or connecting in the coils, according to the direction in which it is turned. The switch shown is a cylinder covered with plates insulated from each other, as indicated by the heavy black lines. In cutting out it short-circuits the coils. In connecting them in it breaks the short circuit. It is mechanically connected with the shaft of motor D. The electric switch or relay A B C is placed in the main line. When the current increases, the magnet or solenoid A turns the switch to the right, diverts the current into motor D, causing it to revolve and move the switch K, so as to connect in additional resistance-coils. This increased resistance at once diminishes the current, exciting the dynamo-electric machines, lowering its electro-motive force, and diminishing the current on the line. When the line-current falls behind the normal, the switch C, motor D, and switch K are turned in the opposite direction, the current exciting the dynamo-electric machine increases, and with it the current on the line. The speed of the prime motor is or may be kept constant by a ball-governor or similar appliance. In both the figures the translating devices (lights) are placed in tension in the main line. If they were placed in derived branches, the solenoid or magnet A would also be placed in such a branch. If the translating devices, Fig. 2, be omitted, so that the resistance of the circuit is constant, the regulator will maintain uniform the speed of the prime motor. If the motor D were mechanically connected (say by worm-gearing) with one or both of the carbon-holders of an arc light, it would feed said holder or holders, maintaining uniform the current through the arc. There are of course various other applications of the new regulator and various modifications of the applications described. This regulator, although shown in my patent of March 6, 1883, No. 273,291, is not specifically claimed, having been reserved for a separate (the present) patent.

The electric motor may be of any known or suitable type. Instead of a motor proper having a commutator, which is preferred for the applications shown, an electro-dynamic apparatus of other appropriate form may be used.

By "electro-dynamic" apparatus is intended any apparatus for translating electrical into mechanical energy.

A brake or other resistant device may be applied to the electro-dynamic apparatus or motor to diminish its sensitiveness and prevent its responding too readily to the current, or responding to an excessive degree.

Having now fully described my said invention and the manner of carrying the same into effect, what I claim is—

1. An electric regulator comprising an electro-dynamic apparatus, in combination with an automatic electric switch or relay and electrical connections, such as explained, for cutting out the aforesaid apparatus or for diverting through it the current, which excites said switch, or a portion thereof, in either direction, so as to allow its remaining stationary or to move it in one direction or the other, according to the direction through it of the said diverted current, substantially as described.

2. The combination, with an electric motor provided with a commutator and placed in a loop of the line-circuit, of an automatic electric switch or relay for cutting out or connecting in said loop, and for reversing the conection of its terminals with the line, substantially as described.

3. The combination of an electro-magnet and mechanical connecting devices with a loop-circuit, and a switch connected with and operated by said magnet for cutting said loop-circuit out of the line, for connecting it in with the line, and for reversing the connection, substantially as described.

4. The combination of a solenoid or axial electro-magnet and its core or armature with a loop-circuit, and a switch connected with and operated by said core or armature for cutting a loop out of line, for connecting it in the line, and for reversing the terminal connections, substantially as described.

5. The combination of the cylindrical switch, axial magnet or solenoid, the core or armature of the latter, and the mechanical connection between it and the switch, substantially as described.

6. The combination of the cylindrical switch, axial magnet or solenoid, armature or core of the latter, mechanical connection between it and the switch, and electro-dynamic apparatus in the loop-circuit of the switch, substantially as described.

7. The combination of the automatic electric switch or relay, operated by an axial magnet or solenoid, with an electric motor included in the loop of said switch, substantially as described.

8. The combination of an automatic electric switch or relay in the main line or a branch thereof, an electro-dynamic apparatus in the loop of the switch or relay, and mechanism operated by said apparatus for directly or indirectly controlling the current through said switch or relay, as by regulating the supply-valve of the motor driving an electrical machine, or by varying a resistance, and the like, said switch or relay having contacts for connecting the aforesaid loop in the main line when the current thereon is abnormal, and for diverting the current through it in one direction or the other when its strength is above or below the normal, so as to move the electro-dynamic apparatus aforesaid in the direction required to correct the variation, substantially as described.

9. The combination of an electric motor, an automatic electric switch or relay for cutting the motor out of circuit, for connecting it in a loop of the main line, and for reversing the connection, and mechanism operated by said motor for directly or indirectly correcting the variations in the line-current, which cause the switch to be shifted, substantially as described.

10. The combination of the solenoid or axial magnet, the switch operated thereby, the electro-dynamic apparatus or electric motor, and the mechanism operated by said apparatus or motor to restore directly or indirectly the normal strength of the line-current, substantially as described.

11. The combination of an electric circuit, one or more generators for supplying electricity to said circuit, mechanism for controlling directly or indirectly the electro-motive force of the generators, an electro-dynamic apparatus or motor for operating said mechanism, and an electric switch or relay for diverting the current or a portion thereof through said apparatus, substantially as described.

In testimony whereof I have signed this specification in the presence of two subscribing witnesses.

MAURICE LEVY.

Witnesses:
 EUG. DUBUIL,
 GUSTAVE LAPOT.